June 14, 1955     T. W. MOORE     2,710,939
REGULATION SYSTEM FOR INVERTER
Filed May 28, 1951
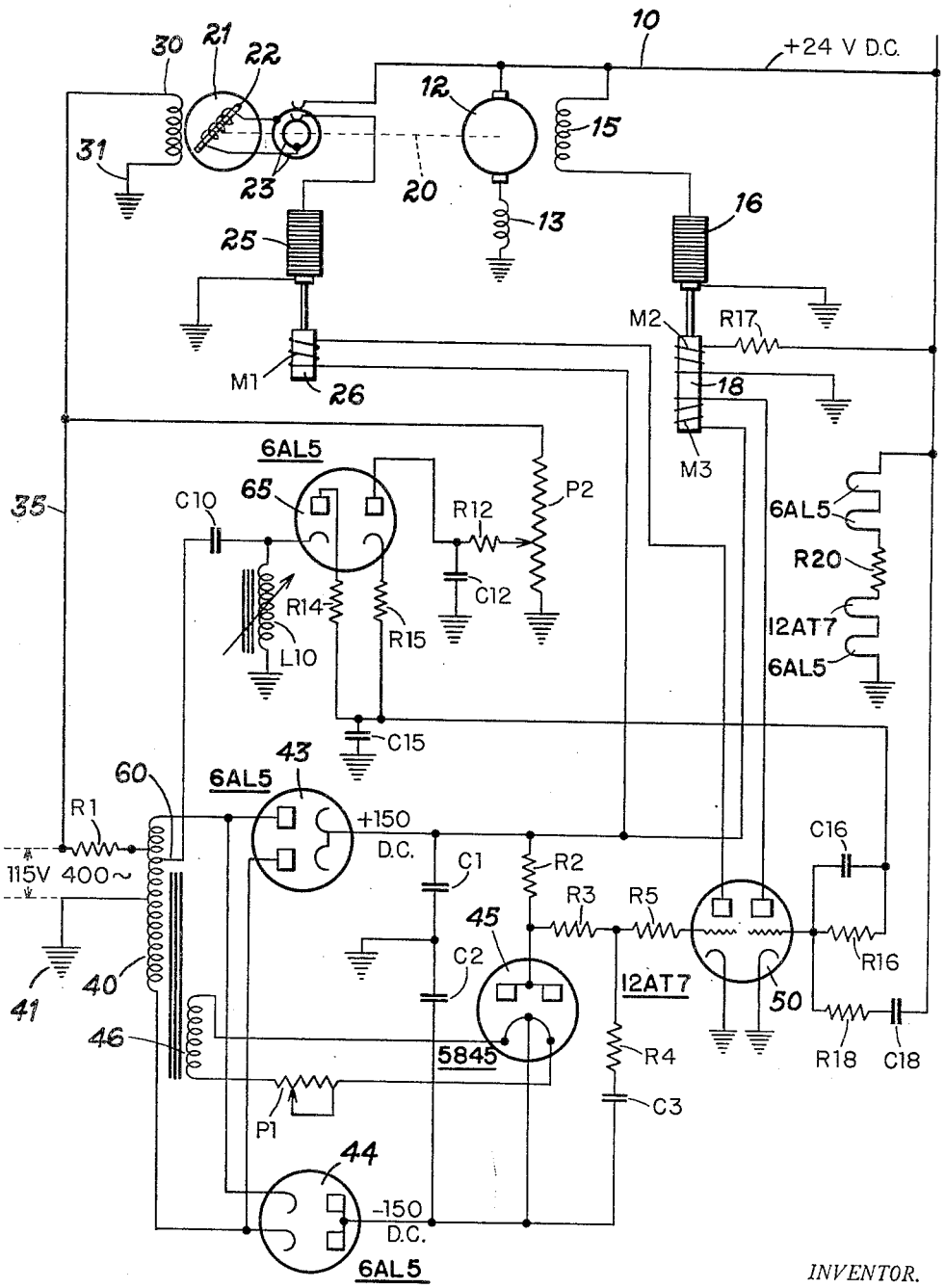
INVENTOR.
THOMAS W. MOORE
BY
Marechal & Biebel
ATTORNEYS United States Patent Office 2,710,939
Patented June 14, 1955

2,710,939

REGULATION SYSTEM FOR INVERTER

Thomas W. Moore, Dayton, Ohio, assignor, by mesne assignments, to American Machine & Foundry Company, New York, N. Y., a corporation of New Jersey Application May 28, 1951, Serial No. 228,714

17 Claims. (Cl. 322—24)

This invention relates to regulators for alternating current generators and more particularly to a regulating system for an inverter.

In self-contained power systems such for example as a power system for an aircraft, or other system of similar characteristics, the maintenance of proper voltage and frequency characteristics may be highly desirable and its achievement with relatively simple controls and without requiring extensive equipment of substantial size and weight has heretofore been difficult of accomplishment. Many such systems for example are operated from a 24 volt D. C. source, to produce a 115 volt, 400 cycle output. Not only are there changes in the output characteristics due to changes in the load on the 400 cycle circuit, but there may be rather substantial changes in the D. C. potential itself, depending upon whether the battery circuit is being charged or discharged, the other load which it is carrying, and the like.

The present invention is especially adaptable for control and regulation of inverter systems of this type such as a low D. C. voltage driven inverter, and has been found to be capable of maintaining both a predetermined voltage and frequency of output with very small variation over the entire range from no load to full load output, and notwithstanding substantial changes in the D. C. voltage. The same conditions of accuracy of regulation can be maintained throughout extremes of temperature variation such as are encountered in aircraft use, and moreover the system is simple, light in weight, and quite compact so that it is readily applicable to aircraft use. In addition, it offers similar advantages for stationary power supplies, whatever the size or intended purpose for which the system is to be used.

It is the principal object of the invention to provide a simple, light weight, small and compact regulating device for regulating the speed or frequency and the voltage output of an inverter to accurate limits.

It is a further object to provide a regulating system of this character which responds immediately to transient conditions and is additionally responsive to changes in the steady state output characteristics.

Other objects and advantages will be apparent from the following description, the accompanying drawing and the appended claims.

In the drawing—

The single figure of the drawing is a schematic wiring diagram showing the regulating system.

Referring to the drawing, the D. C. supply source is indicated at 10, and for purposes of illustration is indicated as a 24 volt supply, the negative side of which is grounded. While such a system is nominally 24 volts, it may easily fluctuate between values of about 23 to 29 volts, depending upon the particular conditions at the time.

The drive consists of a direct current motor, the armature of which is indicated at 12, supplied from the D. C. source, and with a series compensating winding 13 in accordance with usual direct current motor technique. The shunt field winding is shown at 15, one side of which is connected to the source 10, the other side being grounded through a variable resistance device indicated at 16. While various regulating devices may be used for this purpose the preferred construction is the carbon pile regulating mechanism described in applicant's copending application Serial No. 220,290, filed April 10, 1951, and assigned to the same assignee as this application. The armature of this regulator is shown at 18 and it is wound with two energizing coils or magnets M2 and M3 which are wound in opposite directions so that they are in bucking relation with each other.

The motor has a drive shaft indicated in dotted lines at 20 which drives the rotor 21 of the generator. The rotor has an exciter winding 22 which is energized through slip rings 23 from the D. C. voltage source 10. The other side of the exciter circuit is grounded through a second regulating device 25, similar to the regulator 16. This carbon pile device has an armature 26 with a single magnetizing winding M1 thereon which provides for applying pressure to compress the pile in response to being energized.

The output winding of the alternator is shown at 30, and while it may be single or polyphase as desired, for purposes of illustration it is indicated as a single phase winding thereby producing an output circuit supplying a voltage of 115 volts, 400 cycles. One side of the output is grounded as shown at 31.

The main power circuits of the output of the alternator are not indicated, but connection is made by line 35 to one winding of a sensing transformer 40, through a resistor R1 in series therewith, the construction and function of which will be referred to later. Winding 40 is in the nature of an auto transformer, having intermediate grounded tap 41, with extensions of the winding on either side thereof such as to produce a greater voltage at both sides of the grounded central portion thereof.

In order to properly regulate the output of the inverter, circuits are provided responsive first to the voltage independently of frequency or speed, and secondly to speed or frequency independently of voltage. While both portions of the circuit mutually cooperate to accomplish the final desired result, for purposes of description and analysis, they will be described separately, reference being made first of all to that part of the control which is responsive to the voltage output.

The ends of the transformer winding 40 are connected respectively to the anodes and to the cathodes of a pair of rectifier tubes 43, 44, the tubes for example being of the 6AL5 type. This provides a rectified positive potential of approximately 150 volts D. C. on the cathodes of the upper rectifier tube 43 and a negative potential of approximately 150 volts D. C. on the anodes of the lower rectifier tube 44. It will be understood that this pair of rectifier tubes thus responds to the output voltage of the alternator, that is, the envelope of the 400 cycle wave, and that variations in that output will be reflected in corresponding variations in the voltages developed in the output circuits of these rectifiers. At the same time, that voltage condition is practically independent of and thus is not materially affected by variations in the frequency of the output.

These output circuits of the rectifiers are connected into a bridge circuit comprising a pair of condensers C1 and C2 forming one leg of the bridge, the intermediate point between the two condensers being grounded, and condenser C1 being of relatively large capacity such as 0.1 microfarad and the capacity of condenser C2 being relatively small such as 0.01 microfarad.

The other side of the bridge circuit consists of a resistor R2 and the plate resistance of a diode sensing tube 45, shown as a 5845 type. The cathode of this tube is heated from a low voltage secondary winding 46 forming part of transformer 40, and the normal operating temperature of the cathode is controlled to be within the critical range where minor changes in temperature produce major changes in filament emission, about 2500° Kelvin, through the use of a potentiometer P1 which changes the normal temperature condition.

Both legs of the bridge are coupled to the grid of an amplifier tube 50, preferably a dual unit tube such as a 12AT7. Condenser C2 is connected through a coupling condenser C3, resistance R4 and a grid resistance R5 to the left-hand grid of tube 50. Likewise the midpoint between the resistor R2 and the anodes of the sensing tube are connected through resistances R3 and R5 to the same grid.

The anode circuit of this portion of the amplifier tube 50 is connected through the magnetizing winding M1 of the carbon pile regulating device 25, such that control of the space current in this left-hand portion of the amplifier tube under the control voltages applied to the grid thereof will apply a varying magneto-motive force to the magnetizing winding M1 and thus increase or decrease the pressure on the carbon pile 25 with corresponding decrease or increase, respectively, in the exciting current in the field 22 of the generator.

This voltage responsive portion of the circuit functions in the following way. Changes in output voltage are transformed, rectified as positive and negative values of voltage and applied respectively to condensers C1 and C2. The large capacity condenser C1 has sufficient capacity that rapid changes of output voltage of the inverter do not produce a substantial change in the charge thereof. However the capacity of condenser C2 being much smaller, its voltage will change rapidly with changes in the impressed voltage, and hence its charge will vary rapidly with the transient conditions in the output voltage. When therefore such a change occurs, for example a reduction in the output voltage, it is immediately transmitted through the coupling and stabilizing circuit C3, R4, R5 to the left-hand grid of amplifier tube 50, resulting in an increase in the anode current therethrough, applying a greater pressure to the carbon pile 25, and thus increasing the field excitation on the generator. Thus rapidly occurring transient conditions are immediately reflected back and compensated for by an appropriate change in the excitation of the generator.

When a change in the steady state condition takes place, such for example as a maintained reduction in the output voltage, there is no differential effect so far as condensers C1 and C2 are concerned; however the heating current through the cathodes of the sensing tube 45 is reduced, and because of the critical value at which the cathode normally operates, a small reduction in the temperature of such cathode causes a marked variation in the anode current. For example, where the filament or cathode is operated at a temperature in the critical range of about 2500° K., a voltage variation of 10 per cent in the heating circuit to the cathode is sufficient to cause a swing of approximately 80 per cent of the range of the voltage in the bridge circuit. Thus such assumed reduction in the cathode temperature results in a lesser negative potential on the grid, causing an amplified increase in the plate current in the tube 50, with a corresponding increase in pressure applied to the carbon pile 25, thereby tending to restore the voltage to the predetermined level. Adjustment of the potentiometer P1 results in the establishing of the control level to which the tube responds.

The voltage regulator portion of the system thus includes the bridge circuit including the condenser arrangement producing an immediate response to transient changes, and the sensing tube for responding to steady or maintained variations in the voltage output. The corrective effects are further amplified in the amplifier tube 50, and likewise by reason of the amplifying effect produced by the carbon pile device itself. The result is to obtain a highly accurate and fully responsive control for all types of voltage variations.

Referring now to the remaining portions of the circuit which are utilized in the maintenance of predetermined speed or frequency of the output, the transformer 40 is tapped as shown at 60 and connection is made from this point to a tuned circuit comprising condenser C10 and reactance L10. The constants of this circuit are such that it constitutes a tuned circuit with a series resonant frequency somewhat above the output frequency. For example, satisfactory results have been secured where the natural frequency of this circuit is approximately 525 cycles per second. With a supply voltage of 400 cycles per second this circuit has a voltage gain of approximately three times, the voltage gain at true resonance being approximately 10 times.

In order to derive a voltage in the proper phase relation which will be independent of changes in frequency a potentiometer P2 is connected to the output circuit and a voltage with a proper phase relation is obtained therefrom by means of resistor R12 and condenser C12. Preferably the constants of this circuit are such that the voltage produced thereby has a lagging phase shift of around 40°, with essentially the same harmonic content as the voltage from the circuit including condenser C10 and inductance L10. Since the circuit C10, L10 produces a leading phase shift of about 140°, the two voltages are directly opposed to each other in phase.

The circuit consisting of C10, L11 is connected to the cathode of a dual rectifier tube 65, shown as a 6AL5 type, while the circuit including R12 and C12 is connected with the anode of the other portion of the rectifier tube. Resistances R14 and R15 are connected in the respective anode and cathode circuits of the rectifier 65, and a condenser C15 is connected between the resistors and grounded, as shown.

The purpose of this circuit is to derive a control function responsive to the speed or frequency of the output, and substantially unaffected by the output voltage. By means of the tuned circuit C10, L10 as above described, changes in frequency are made to have substantially more control effect (by several times) than that produced by changes in voltage, and hence for practical purposes the circuit becomes frequency responsive and substantially unresponsive to voltage change. With the rectifier tube 65 connected as shown, both circuits provide simultaneous equal pulses of rectified alternating current when the frequency is at the proper value, but of opposite polarity, to condenser C15. When the frequency changes, one of these voltages will increase or decrease rapidly while the other will remain the same. The voltage developed across C15 is caused to vary rapidly with changes in the applied frequency, minimizing any large alternating current components which might arise if the signal pulses occurred in different timed relation with each other. The resultant voltage or resultant potential on condenser C15 is therefore relatively free from alternating current ripple, although the capacity of this condenser is relatively small and it is able to follow rapid changes in circuit voltages.

Condenser C15 is connected through a stabilizer circuit including resistor R16 and condenser C16 with the grid of the other or right-hand half of the 12AT7 tube 50. The magnetizing coil M3 associated with the carbon pile 16 is connected in the anode circuit of this portion of tube 50 and thus responds to variations in the frequency as determined by the frequency sensitive network. Energizing or magnetizing coil M2, also associated with carbon pile regulator 16, is supplied with direct current through resistor R17 from the voltage source 10 and thus forms an essentially constant source of magneto-motive force developing a flux in the armature. Normally, winding M2 has slightly more than enough magneto-motive force to counteract that of winding M3 under its maximum conditions, and as above described these windings are so arranged as to be in opposing relation to each other.

In order to provide for prompt correction in the event of transient variations in the voltage of the D. C. source 10, a connection is made from that source through condenser C18 and resistor R18 to the grid of the right-hand section of tube 50. Due to the presence of the condenser in this circuit, it does not respond to steady state conditions, but does respond to transient or variable conditions in the D. C. supply source. Thus it will immediately produce a change upon the grid of the right-hand section of tube 50 in the direction to compensate for a change in the supply voltage of the source and prior to the time that the system could become unbalanced as a result of such change. For instance a drop in the D. C. voltage will apply a positive charge to the grid of tube 50, reducing the current in M3 and allowing M2 to compress the pile 25 to counteract an incipient speed reduction.

Also as shown the cathodes of all of the several tubes 43, 44, 45 and 50 are preferably connected in series, together with a suitable resistor R20 to produce the correct amount of series resistance in a circuit, so that the burning out of any one such filament will result in deenergization of all of the tubes and the system will in effect be shut down and will no longer regulate. Analysis will show that in this event, maximum field excitation will be supplied to shunt field 15 and hence the drive motor will operate at its slowest speed as a safety measure.

Referring now to the operation of the frequency responsive portion of the circuit, and assume an increase in frequency in the output of the generator. When this occurs the voltage across C10, L10 increases because the frequency is closer to the resonant frequency of the tuned circuit. Potentiometer P2 being unaffected by frequency changes, its voltage remains essentially constant. As a result, the voltage across R14 increases relative to that across R15, producing a net negative change or voltage reduction upon condenser C15. As above described, the phasing network R12, C12 maintains the phase relationships such that the tube portions of the rectified waves appear in substantially opposite timed relation to each other and thus produce a net effect upon condenser C15.

The increased negative bias on the right-hand portion of the tube 50, transmitted from condenser C15 through the stabilizer circuit C16, R16 causes a reduction in the plate current through the right-hand portion of the tube, thereby reducing the magneto-motive force developed by M3, and allowing a greater net force to be applied by coil M2 to carbon pile 16. This causes an increase in the field excitation on motor 12 with a resultant slowing down of the speed or reduction in the frequency to restore the initial condition. Similarly, a brief reduction in the voltage of the D. C. supply source will result in an increased positive change on the grid of the right-hand portion of tube 50, increasing the current through winding M3, and thus reducing the net force applied to carbon pile 16. This reduces the shunt field and the motor immediately tends to speed up, although this is only a transient condition since the circuit changes described is not responsive to any maintained variation, but only to transient variations in the D. C. supply voltage. Regulation to a desired frequency may be effected by changing the setting of potentiometer P2 or by varying either C10 or L10.

As above described resistance R1 is connected in the circuit from the output of the alternator to the transformer winding 40. This resistor is preferably such that it has a negative temperature characteristic, being made of carbon for example, and its purpose is to provide voltage compensation essentially proportional to the load for the speed regulating portion of the system and thus to compensate for the load variations upon the output of the machine.

Similarly resistor R1 compensates for changes in the frequency due to load. Where an increase of load on the output takes place, it would normally result in a slight drop in the output voltage and in the frequency. The result of the voltage change would be an increase in the current through the left-hand portion of tube 50 to apply greater pressure to magnet M1, thereby increasing the excitation of the generator field. Similarly, a reduction in frequency tends to increase the current in the other or right-hand portion of tube 50, in the manner already described. It is seen, therefore, that the effect of an increase in the load applied to the output of the inverter is such as to increase the current in both anode circuits of tube 50. This obviously requires a greater flow of current through transformer 40, and a similar increase in current in resistance R1. An increased voltage drop thus occurs both in the winding itself and in the resistor R1 and it will thereby be seen that this effect takes place in the direction to produce added compensation, both as to speed and voltage, to correct for variations in the load applied to the output circuit. Moreover the negative temperature characteristic of the resistor R1 compensates for the changing resistance of the transformer and other circuit elements due to temperature changes.

The following table is indicative of typical values of the electrical constants which have been found to produce highly satisfactory results in the system as described, such for example as maintaining speed and voltage within approximately 1 per cent of the predetermined values over wide temperature changes, and from no load to full load:

Resistances:
| | | |
|---|---|---|
| R1 | ohms | 390 |
| R2 | megohm | 1 |
| R3 | ohms | 390,000 |
| R4 | do | 390,000 |
| R5 | do | 390,000 |
| R12 | do | 18,000 |
| R14 | do | 390,000 |
| R15 | do | 390,000 |
| R16 | megohms | 1 |
| R17 | ohms | 560 |
| R18 | do | 390,000 |
| R20 | do | 4.7 |
| P1 | do | 10 |
| P2 | do | 10,000 |

Inductances:
| | | |
|---|---|---|
| L10 | henries | 9.1 |

Condensers:
| | | |
|---|---|---|
| C1 | microfarads | 0.1 |
| C2 | do | 0.01 |
| C3 | do | .033 |
| C10 | do | .01 |
| C16 | do | .1 |
| C18 | do | .22 |

The invention thus provides a regulaitng system which is simple, highly accurate and satisfactory in operation, which is small, compact, light in weight, and which is capable of improved efficiency of performance. The utilization of the carbon pile device contributes to these advantages, and avoids unnecessary losses which would otherwise be occasioned if multiple field windings for example were employed in the drive motor. The device is thus highly satisfactory for installations where high performance characteristics are desired coupled with compactness and lightness in weight, such for instance as in connection with aircraft equipment, and the like.

The term "inverter" as used herein is intended to apply to a system incorporating a direct current motor from which mechanical power may be taken if desired and which drives an alternator supplying the alternating current used in the control circiuts and from which additional electrical energy may also be taken if desired.

While the form of apparatus herein described constitutes a preferred embodiment of the invention, it is to be understood that the invention is not limited to this precise form of apparatus, and that changes may be made

What is claimed is:

1. A regulating system for an inverter adapted to be driven from a source of direct current and providing for maintaining a predetermined output voltage and frequency which comprises means connected to the output of said inverter responsive to the voltage thereof, additional means connected to said output responsive to the frequency thereof, means in said voltage responsive means sensitive to transient changes in voltage, means in said voltage responsive means for establishing a predetermined steady state value of voltage, means controlled jointly by said transient responsive means and said steady state responsive means for regulating the excitation on said alternator, and means controlled by said frequency responsive means for varying the drive speed of said inverter to maintain a predetermined output frequency.

2. A regulating system for an inverter adapted to be driven from a source of direct current and providing for maintaining a predetermined output voltage and frequency which comprises means connected to the output of said inverter responsive to the voltage thereof, additional means connected to said output responsive to the frequency thereof, means in said voltage responsive means sensitive to transient changes in voltage, means in said voltage responsive means for establishing a predetermined steady state value of voltage, means controlled jointly by said transient responsive means and said steady state responsive means for regulating the excitation on said alternator, means controlled by said frequency responsive means for varying the drive speed of said inverter to maintain a predetermined output frequency, means responsive to transient changes in the voltage of said D. C. supply, and means controlled by said D. C. responsive means for likewise varying the drive speed of said inverter.

3. A regulating system for an inverter adapted to be driven from a source of direct current providing for maintaining a predetermined output voltage and frequency which comprises means connected to the output of said inverter continuously responsive to the voltage thereof, means connected to the output of said inverter continuously responsive to the frequency thereof including a tuned circuit having a resonant frequency above the desired output frequency and such that a substantial gain is provided therein for such output frequency, means controlled by said voltage responsive means for varying the excitation of said inverter over a continuous range to maintain a predetermined output voltage, and means controlled by said frequency responsive means for varying the drive speed of said inverter over a continuous range to maintain a predetermined output frequency.

4. A regulating system as defined in claim 3 in which a phase shifting network is connected to the output of said inverter for shifting the phase of the voltage wave, and dual rectifier means having one part connected to said tuned circuit and the other part connected to said phase shifting network for producing opposed rectified voltages in similar phase relation to each other, said tuned circuit causing one of said rectified voltages to vary substantially in amplitude in accordance with variations of the output frequency from a predetermined standard, and means controlled by the difference of said rectified voltages for controlling the speed of operation of said inverter.

5. A regulating system for an inverter adapted to be driven from a source of direct current providing for maintaining a predetermined output voltage and frequency which comprises a transformer connected to the output of said inverter, a circuit connected with said transformer and responsive to the voltage of said inverter, another circuit connected with said transformer and responsive to the frequency of said inverter, an electronic amplifier, means controlled by said voltage responsive and said frequency responsive means respectively for controlling the space currents through said amplifier, means actuated by said space currents respectively for varying the excitation of said inverter and the speed of operation thereof and means in circuit with said transformer for producing an increased change in both said circuits in response to changes in the output voltage and frequency of said inverter.

6. A regulating system for an inverter adapted to be driven from a source of direct current providing for maintaining a predetermined output voltage and frequency which comprises means connected to the output of said inverter responsive to the voltage thereof, means connected to said output responsive to the frequency thereof, a carbon pile regulator device for controlling the drive speed of said inverter, means energized from said source of direct current for applying a substantially constant first magnetic force to said pile tending to reduce the speed of said inverter, and means actuated from one of said responsive means for applying a second counter magnetic force to oppose and reduce the effect of said first such force providing for compression of said pile with resulting operation of said inverter at its minimum speed upon failure of said responsive means.

7. A regulating system for an inverter adapted to be driven from a source of direct current providing for maintaining a predetermined output voltage and frequency which comprises means connected to the output of said inverter responsive to the voltage thereof, means for amplifying the changes in voltage occurring in said voltage responsive means, means connected to said output responsive to the frequency thereof, means for amplifying to a substantially similar amount the changes in voltage occurring in said frequency responsive means, a first carbon pile regulating device for controlling the excitation of said inverter, a second carbon pile regulating device for controlling the speed of said inverter, means controlled by said voltage responsive amplifying means for operating said first carbon pile to regulate said output voltage of said inverter, and means controlled by said frequency responsive amplifying means for operating said second carbon pile to regulate the speed of said inverter.

8. A regulating system for maintaining a predetermined output voltage and frequency of an inverter driven from a source of direct current comprising a sensing transformer, means for connecting said sensing transformer to the output of said inverter through a load resistance, means energized through said sensing transformer and selectively responsive to the voltage and to the frequency of the output of said inverter, electronic devices energized through said sensing transformer, means controlled by said electronic devices providing for increased current flow therethrough in response to reduction in both voltage and frequency of said output circuit below predetermined values for applying a corrective force to said inverter, said increased currents resulting in increased line drop through said load resistance providing compensation for load loss in the output of said inverter.

9. A regulating system for an inverter having an exciter winding and an output circuit and adapted to be driven by a drive motor which comprises means responsive to the output voltage of said inverter substantially independently of the frequency thereof, a bridge circuit selectively responsive to a transient in said output voltage, a first electronic space current device responsive to changes in the steady state of said output voltage, and means including another electronic space current device controlled jointly by said bridge circuit and by said first electronic device for varying the excitation of said exciter winding to maintain substantially constant output voltage.

10. A regulating system as defined in claim 9 in which said means for varying the excitation of said exciter winding includes a carbon pile device.

11. A regulating system for an inverter having a field winding and an output circuit and adapted to be driven by a drive motor operating from a D. C. supply and incorporating a speed control which comprises means responsive to the output frequency of said inverter including a resonant circuit having a natural frequency such that it is detuned from resonance with the desired output frequency, means balancing the voltage wave of said inverter output with the voltage of said resonant circuit, means responsive to the resultant of said balanced voltages for varying the speed of said drive motor to maintain substantially constant output frequency, and means responsive to a transient change in said D. C. supply for modifying said resultant in the proper sense to counteract the effect of said change.

12. A regulating system as defined in claim 11 in which said means for varying the speed of the drive motor incorporates a carbon pile device.

13. A regulating system for an inverter having a field winding and an output circuit and adapted to be driven by a drive motor incorporating a speed control which comprises means responsive to the output frequency of said inverter including a resonant circuit having a natural frequency such that it is detuned from resonance with the desired output frequency and adapted to have a substantial gain for voltage of the desired frequency, means balancing the voltage wave of said inverter output with the voltage of said resonant circuit, a substantially constant source of magneto-motive force, and means responsive to the resultant of said balanced voltages for producing a magneto-motive force opposing said constant magneto-motive force to apply a corrective effect to control the speed and frequency of said inverter.

14. A regulating system for an inverter having a field winding and an output circuit and adapted to be driven by a drive motor incorporating a speed control which comprises means responsive to the output frequency of said inverter including a resonant circuit having a natural frequency such that it is detuned from resonance with the desired output frequency and adapted to have a substantial gain for voltage of the desired frequency, a phase shifting network, rectifier means connected with said network for producing two opposing voltages one varying with variations in the frequency and the other substantially independent of said frequency and in phase opposition to said one voltage, and means controlled by the resultant of said opposing voltages for controlling the speed of said drive motor to maintain a predetermined frequency of said output.

15. A regulating system for an inverter having a field winding and an output circuit and adapted to be driven by a drive motor from a direct current supply incorporating a speed control which comprises means responsive to the output of said inverter, a resonant circuit having a natural frequency such that it is detuned from resonance with the desired output frequency, means balancing the voltage wave of said inverter output with the voltage of said resonant circuit, a means responsive to the resultant of said balanced voltages for producing a correction in the speed of drive motor, and means responsive to a transient change in the direct current supply to said drive motor for producing a temporary corrective change in the speed of said drive motor.

16. A regulating system for an inverter having a field winding and an output circuit and adapted to be driven by a drive motor from a source of direct current which comprises means responsive to the output frequency of said inverter for producing a voltage varying in relation thereto, a carbon pile device having a pair of magnetizing windings and connected for controlling the speed of said drive motor, means for energizing one of said magnetizing windings at a substantially constant value from said source of direct current to develop a substantially constant force on said pile, and means responsive to said output frequency voltage for energizing the other of said magnetizing windings in opposing relation to the first said winding with a lesser force to apply a resultant force to said carbon pile device for maintaining a desired speed of said motor.

17. A regulating system for an inverter having a field winding and an output circuit and adapted to be driven by a drive motor from a source of direct current which comprises means responsive to the output frequency of said inverter including a resonant circuit having a natural frequency such that it is detuned from resonance with the desired output frequency and adapted to have a substantial gain for voltage of the desired frequency, means balancing the voltage output of said generator with the voltage of said resonant circuit, a carbon pile device having a pair of magnetizing windings and connected for controlling the speed of said drive motor, means for energizing one of said magnetizing windings at a substantially constant value from said source to direct current to develop a substantially constant force on said pile, and means responsive to the resultant of said balanced voltages for energizing the other of said magnetizing windings to produce a magneto-motive force in opposition to that of said first winding with a lesser force to apply a resultant effective upon said carbon pile device for controlling the speed of said drive motor.

References Cited in the file of this patent

UNITED STATES PATENTS

| | | |
|---|---|---|
| 2,157,893 | Gulliksen | May 9, 1939 |
| 2,356,397 | Grabau | Aug. 22, 1944 |
| 2,399,266 | Stiefel | Apr. 30, 1946 |
| 2,521,639 | Lauricella et al. | Sept. 5, 1950 |